Patented Jan. 8, 1929.

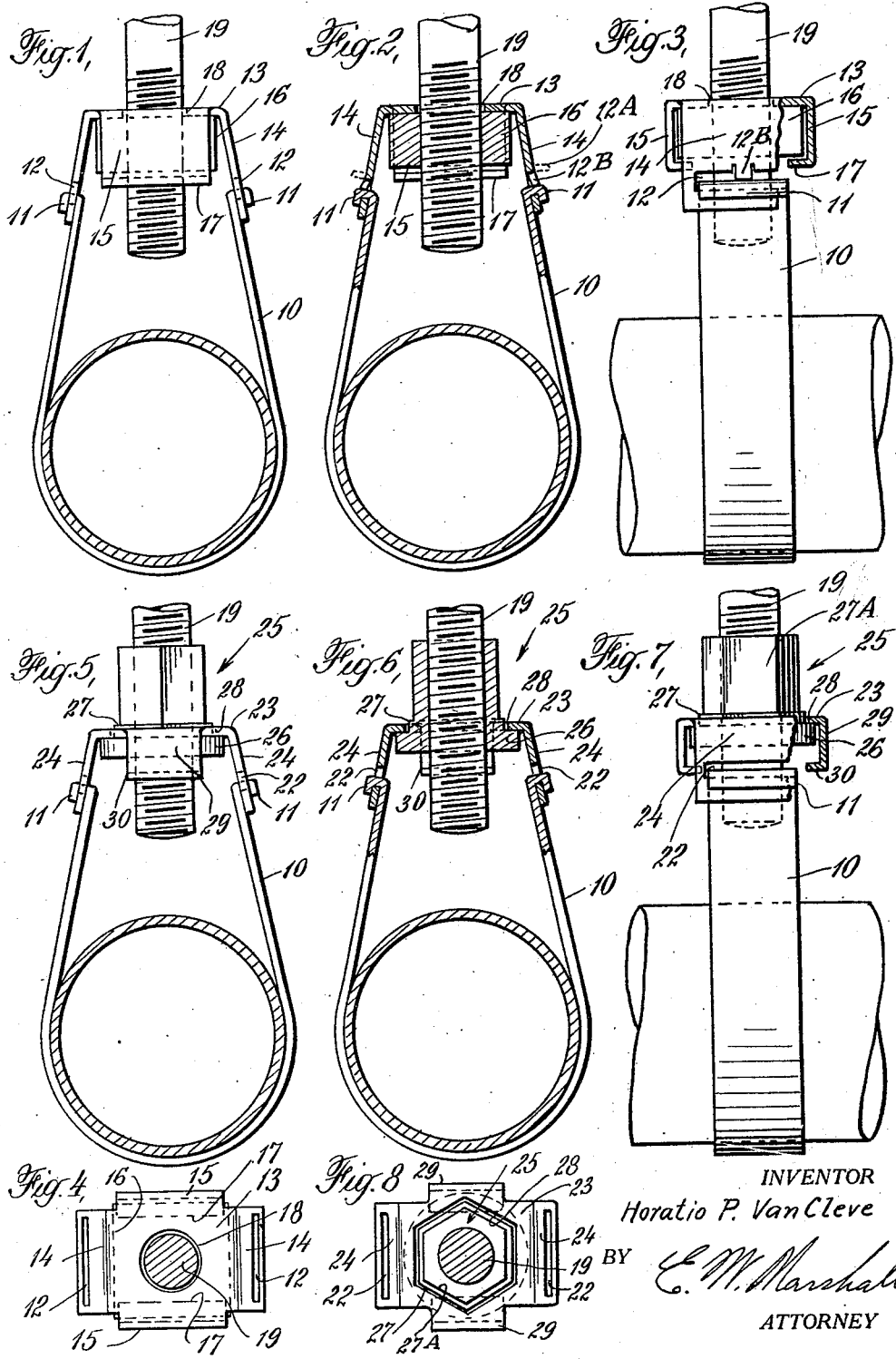

1,698,571

UNITED STATES PATENT OFFICE.

HORATIO P. VAN CLEVE, OF CRANFORD, NEW JERSEY, ASSIGNOR TO J. EDWARD OGDEN, OF MOUNTAINVILLE, NEW YORK.

PIPE HANGER.

Application filed October 20, 1922. Serial No. 595,707.

This invention relates to supports and more particularly to supports of the type known as pipe hangers used for suspending overhead pipe lines.

One of the objects of the invention is to provide a pipe hanger comprising few parts and so constructed that the parts can be made from metal stampings thus making the construction very inexpensive.

Another object of the invention is to provide a hanger so constructed as to be adjustable after installation.

Another object of the invention is to provide a hanger having the carrier or pipe engaging member so connected to the other parts of the hanger that the carrier and pipe can be taken down without disturbing the remaining parts of the hanger.

Further objects of the invention will appear from the following specification taken in connection with the drawings, which form a part of this application, and in which—

Fig. 1 is an elevational view illustrating one form of hanger constructed in accordance with the invention.

Fig. 2 is a view similar to Fig. 1, but showing the carrier ends and means for connecting the carrier to the supporting rod in section.

Fig. 3 is an elevational view partly broken away and partly in section taken at right angles to Fig. 1.

Fig. 4 is a top plan view of the connecting member which in conjunction with a threaded element or nut connects the carrier to the supporting rod or bolt.

Fig. 5 is an elevational view similar to Fig. 1, but showing another embodiment of the invention.

Fig. 6 is a view similar to Fig. 2, but illustrating in section the parts shown in Fig. 5.

Fig. 7 is an elevational view partly broken away and partly in section taken at right angles to Fig. 5, and Fig. 8 is a top plan view of the connecting member which in conjunction with the threaded element connects the strap ends to the bolt or rod from which the hanger is suspended.

The invention briefly described comprises a carrier detachably connected to a housing in which is mounted a nut or threaded element which in turn is adapted to be connected to or threaded on a bolt, rod or other member from which the hanger is suspended. In the particular forms of the invention illustrated the carrier consists of a single strap having hooked ends adapted to engage slots in the housing member and the housing member is provided with downwardly and inwardly turned portions for engaging a nut or threaded element into which is threaded the supporting rod or bolt.

Further details of the invention will appear from the following description.

Referring first to the form of the invention illustrated in Figs. 1 to 4 inclusive, the carrier 10 is provided with hooked ends 11 adapted to pass through elongated slots 12 formed in the housing or saddle member 13. Tabs 12$^A$ are then bent down to position 12$^B$. The member 13 is preferably formed from sheet metal and is provided with downward extending ears 14 in which are formed the slots 12 and with downwardly extending tabs 15 adapted to form a housing for retaining a threaded member or nut 16. After the nut has been positioned between the tabs 15 the ends of the tabs 15 shown at 17 are bent inwardly thereby retaining the nut in position. As clearly illustrated in Fig. 4, the ears 14 and the tabs 15 are disposed substantially at right angles to each other since the nut 16 illustrated in connection with this embodiment is square.

The saddle member or housing 13 has formed in its upper surface a central opening 18 for receiving the threaded shank 19 of a bolt, rod or other supporting member.

With the form of the invention shown in Figs. 1 to 4 inclusive the saddle member 13 may be adjusted before connecting the carrier 10 thereto.

In the form of the invention shown in Figs. 5 to 8 inclusive the saddle member 23 has downwardly extending ears 24 having slots 22 for receiving the hooked ends 11 of the carrier 10. Instead, however, of using a square nut 16 a sleeve 25 is threaded onto the rod 19 and the sleeve 25 has a head 26 adapted to engage the under surface of the saddle member 23 and also has a hexagonal portion 27 received by a correspondingly shaped hexagonal opening 28 in the central portion of the saddle member 23. The engagement of the hexagonal shoulder or portion 27 with the hexagonal opening 28 in the saddle 23 prevents accidental rotation of the sleeve 25. When, however, it is desired to rotate this sleeve, the saddle must be lifted from engagement with the head 26 of the sleeve until the hexagonal portion 27 of the sleeve is free from the hexagonal opening in the saddle. The upper part 27^A of the sleeve may also be flattened or made hexagonal as shown, for the purpose of facilitating the manipulation of the device.

The saddle 23 in this embodiment is also provided with downwardly extending tabs 29 having inturned end portions 30 for confining the head 26 of the sleeve 25.

Although certain specific embodiments of the invention have been particularly shown and described it will be understood that the invention is capable of further modification and that further changes in the construction and arrangement of the various cooperating parts may be made without departing from the spirit or scope of the invention as expressed in the following claims.

What I claim is:

1. A pipe hanger comprising a carrier having hooked ends, a saddle member having slotted portions detachably engaged by said ends and a threaded member carried by said saddle member and embraced by tabs formed on the saddle member and extending beneath the threaded member.

2. A pipe hanger comprising a carrier, a sheet metal saddle member having downwardly extending portions detachably connected with the carrier and a threaded element carried by said saddle member and secured thereto by an inwardly bent tab formed on the saddle member and extending beneath the threaded member.

3. A pipe hanger comprising a carrier, a sheet metal saddle member having downwardly extending portions detachably connected with the carrier and a threaded element carried by said saddle member and secured thereto by inwardly bent tabs formed on the saddle member, said saddle member having a central opening in line with the threaded portion of the threaded element.

4. A pipe hanger comprising a carrier, a sheet metal saddle member having downwardly extending portions detachably connected with the carrier and a threaded nut carried by said saddle member and secured thereto by inwardly bent tabs formed on the saddle member.

5. A pipe hanger comprising a carrier strap having hooked ends, a saddle member having downwardly extending ears with elongated slots receiving said hooked ends, a threaded element and means on said saddle member extending beneath the threaded element for securing said element in assembled relation on the saddle.

6. A pipe hanger comprising a carrier strap having hooked ends, a saddle member having downwardly extending ears with elongated slots receiving said hooked ends and a threaded element carried by the saddle member, said saddle member having tabs engaging and disposed below said element.

7. A pipe hanger comprising a carrier strap having hooked ends, a saddle member having downwardly extending ears with elongated slots receiving said hooked ends and a threaded element carried by the saddle member, said saddle member having tabs engaging and extending beneath said element and having an opening registering with the threaded opening in the threaded element.

8. A pipe hanger comprising a saddle member constructed with a non-circular opening through its upper portion, a sleeve having an enlarged portion below said upper portion of the saddle member, a portion extending above the saddle member and an intermediate portion fitting said opening and conforming in shape thereto.

In witness whereof, I have hereunto set my hand this 19th day of October, 1922.

HORATIO P. VAN CLEVE.